(12) United States Patent
Biran et al.

(10) Patent No.: US 6,658,521 B1
(45) Date of Patent: Dec. 2, 2003

(54) METHOD AND APPARATUS FOR ADDRESS TRANSLATION ON PCI BUS OVER INFINIBAND NETWORK

(75) Inventors: Giora Biran, Haifa (IL); Vadim Makhervaks, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 09/772,376

(22) Filed: Jan. 30, 2001

(30) Foreign Application Priority Data

Dec. 22, 2000 (EP) .............................................. 00811233

(51) Int. Cl.⁷ .............................................. G06F 13/00
(52) U.S. Cl. ...................................... 710/315; 710/313
(58) Field of Search ........................... 710/300, 22, 26, 710/28, 36, 35, 107, 305, 306, 308, 310, 311, 313, 315; 709/212

(56) References Cited

U.S. PATENT DOCUMENTS 6,243,787 B1 * 6/2001 Kagan et al. ............... 710/263
6,594,712 B1 * 7/2003 Pettey et al. ................ 710/22

* cited by examiner

Primary Examiner—Glenn A. Auve
(74) Attorney, Agent, or Firm—Ohlandt, Greeley, Ruggiero & Perle, L.L.P.; Daniel P. Morris

(57) ABSTRACT

A system having a plurality of PCI devices, a PCI bus, a host system with a host memory, an network, and a target channel adpater. The plurality of PCI devices are attached to the PCI bus, which is connected via the target channel adpater and the network to the host system. The target channel adpater translates PCI bus transactions and PCI bus interrupts into network requests and network requests to PCI transactions. Each of the PCI devices has a PCI address range associated with it. A PCI memory window is allocated on the target channel adpater and is assigned to the host system. The PCI devices are enabled to post a pseudo address that belongs to the target channel adpater on the PCI bus when reading data via the network from the host memory or when writing data in the host memory via the network, the pseudo address comprising a base part (VABase) and an offset part (Offset). The base part (VABase) identifies the PCI memory window being assigned to the host system and the offset part (Offset) is useable for calculating a virtual address (VA) specifying a physical memory location in the host memory.

31 Claims, 3 Drawing Sheets

METHOD AND APPARATUS FOR ADDRESS TRANSLATION ON PCI BUS OVER INFINIBAND NETWORK

FIELD OF THE INVENTION

The present invention concerns a scheme for the connection of nodes in general, and the connection of nodes in an InfiniBand configuration in particular.

BACKGROUND OF THE INVENTION

The PCI bus standard is wide spread. Many of today's computer systems and switches have a PCI bus and there is a huge variety of input/output (I/O) devices and PCI adpaters available for such devices. A schematic representation of typical PCI system 10 is illustrated in FIG. 1.

The InfiniBand standard is an example of a standard that concerns system area networks (SAN) connecting nodes, e.g., input/output (I/O) devices, within a distributed computer system. According to the Infiniband standard, there is an InfiniBand fabric through which the I/O devices are connected. InfiniBand is a common I/O specification that delivers a channel-based, switched fabric technology that is designed for adoption by the industry.

An example of an InfiniBand configuration is depicted in FIG. 2. As illustrated in FIG. 2, an InfiniBand system 30 typically comprises three different kind of devices, namely, an InfiniBand fabric 20, a host system 21 with a host channel adapter (HCA) 22 and an input/output unit (IOU) 23 with an InfiniBand target channel adpater (TCA) 24. The IOU 23 may comprise one or more I/O devices 31, 32 and is attached to the InfiniBand fabric 20 via the TCA 24. A TCA is a component that terminates the SAN in an I/O device that requires support only for capabilities appropriate to the respective I/O device. The HCA terminates the SAN in a host. It requires support for the ability to communicate with I/O devices in TCAs and to implement inter-processor communication (IPC) with other HCAs. An InfiniBand configuration comprises a software service package (SSP) that is responsible for the TCA initialization, connection establishment, management, and the service provision for device drivers. The SSP is installed on the host system.

Such a basic InfiniBand system 30 can be expanded by connecting additional host systems 25 and 26, and/or IOUs 27 and 28. The transition from PCI-based systems to InfiniBand-based ones will take some time and investment since the existing PCI devices have to be replaced step-by-step with new InfiniBand native devices.

Initially, most vendors and commercial users will want to attach the existing PCI devices to the InfiniBand fabric through InfiniBand-to-PCI bridges. This poses many difficulties because different hosts can be attached to a number of different devices sharing the same PCI bus. Therefore, the bridges will have to distinguish between addresses that are posted on the PCI bus in order to enable the bridge to translate the address to the appropriate InfiniBand transaction and to send it to the respective host.

It is an object of the present invention to provide a method and apparatus for an address translation on a PCI bus over a network, such as an InfiniBand network. The scheme presented herein delivers a cost-effective solution in that it allows legacy I/O devices like PCI and PCI-X devices to be connected via the InfiniBand to hosts. With the present invention, one can realize communication systems, which allow a multitude of I/O devices, host processor nodes, and I/O platforms to be connected in high bandwidth, low latency, scalable environment.

SUMMARY OF THE INVENTION

The present invention concerns methods and systems enabling PCI devices to read data via an InfiniBand network from a memory region of a host system or to write data to a memory region on a host system via the InfiniBand network. The PCI devices are attached to a PCI bus and connected to the InfiniBand network via a target channel adpater that translates PCI bus transactions and interrupts into InfiniBand requests and that translates InfiniBand requests to PCI transactions. Each PCI device that is attached to the PCI bus has a PCI address range associated with it. According to the present invention, a PCI memory window is allocated on the target channel adpater, the PCI memory window being assigned to the host system. A pseudo address that belongs to the target channel adpater is posted on the PCI bus when reading data via the InfiniBand network from a host system or when writing data on a host system via InfiniBand, the pseudo address comprising a base part (VABase) and an offset part (Offset). The base part (VABase) is used to identify the PCI memory window being assigned to the host system and the offset part (Offset) is used for calculating a virtual address (VA) specifying a physical memory location at the host system.

Advantages of the present invention are addressed in connection with the detailed description or are apparent from the description.

BRIEF DESCRIPTION OF THE DRAWING

The invention is described in detail with reference to the following schematic drawings. It is to be noted that the Figures are not drawn to scale.

DETAILED DESCRIPTION OF THE INVENTION

Figure 1:
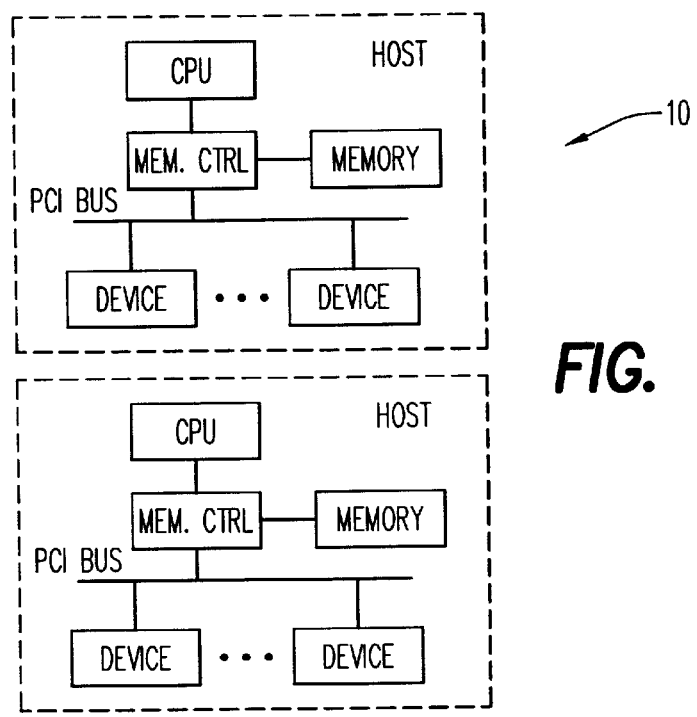
FIG. 1 is a schematic representation of conventional PCI systems.
Figure 2:
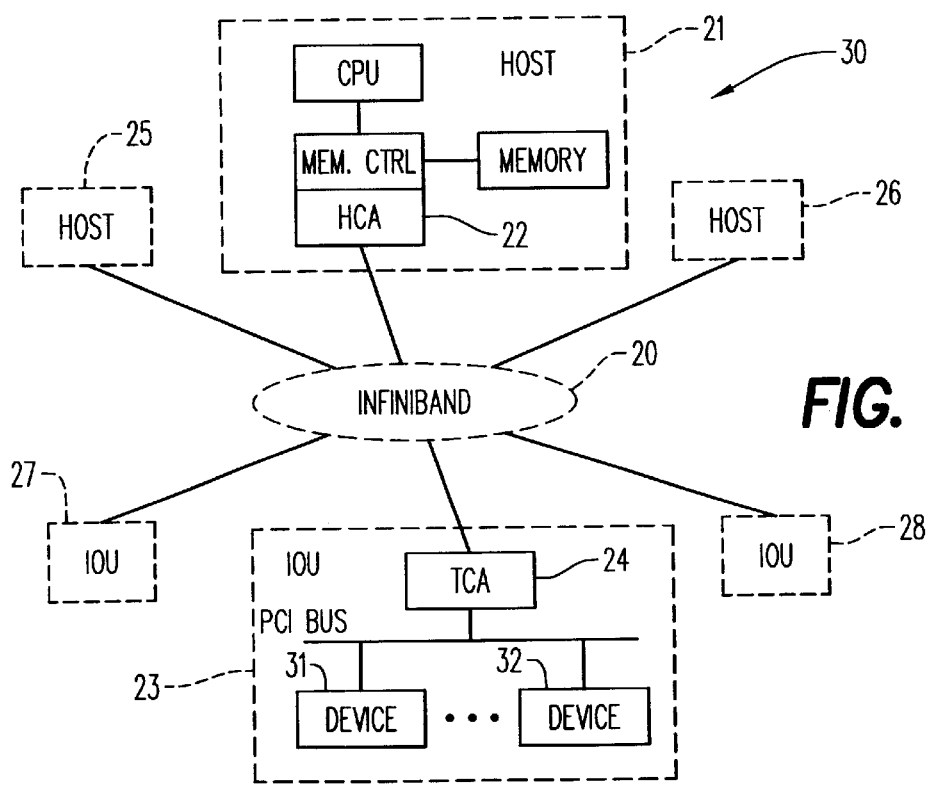
FIG. 2 is a schematic representation of an InfiniBand configuration.
Figure 3:
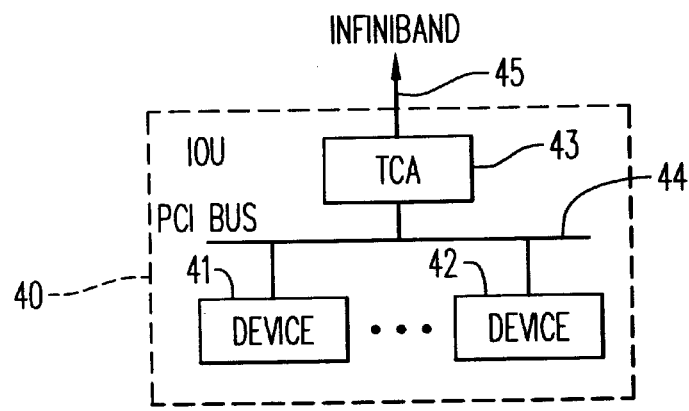
FIG. 3 is a schematic representation an input/output unit (IOU) as used in InfiniBand configurations.

One possible InfiniBand configuration is illustrated in FIG. 3. It enables the use of legacy PCI devices (I/O devices 41 and 42) in an InfiniBand environment 45. A plurality of I/O devices 41 and 42 are combined to form an IOU 40. This IOU 40 comprises the I/O devices 41 and 42, which are attached to a PCI bus 44 and connected to the InfiniBand environment 45 via a TCA 43, as shown in FIG. 3. The TCA 43 is kind of a PCI bridge that translates the PCI bus transactions and interrupts into InfiniBand requests. The TCA 43 also translates incoming InfiniBand requests to PCI transactions.

This translation is done as follows:

PCI-to-InfiniBand transaction translation:

The PCI write transaction is translated to the remote direct memory access (RDMA) Write InfiniBand transaction;

The PCI read transaction is translated to the RDMA Read InfiniBand transaction; and The PCI interrupt is translated to the Send InfiniBand transaction.

InfiniBand-to-PCI transaction translation:

The RDMA Write InfiniBand transaction is translated to the PCI write transaction; and The RDMA Read InfiniBand transaction is translated to the PCI read transaction.

The RDMA Write, the RDMA Read, and the RDMA Send transactions are standard InfiniBand transactions defined by the InfiniBand Association (IBA) specification.

The host systems communicate with the PCI devices (I/O devices 41 and 42) via InfiniBand environment 45. The I/O devices 41 and 42 are neither aware that the PCI bus 44 is not connected directly to the host systems nor that different I/O devices 41 and 42 on the same PCI bus 44 can be used simultaneously by different host systems. Each of the I/O device 41 and 42 uses PCI native memory semantics to communicate with the corresponding device driver on the host system. The device driver provides the I/O devices 41 and 42 with all the necessary information about the memory mapping on the host system.

The TCA 43 has an SSP component on the host system (not shown in FIG. 3). The SSP is responsible for initializing the TCA 43, establishing a connection, managing the connection, and for providing services for the device driver (s) on the host systems.

When one of the I/O devices 41 or 42 wants to read from the memory of the host system, it posts the command, the data, and the destination address inside the host memory on the PCI bus 44. The TCA 43 is designed to make a connection to InfiniBand environment 45 transparent for the I/O devices 41 and 42. The TCA 43 detects the PCI transaction, translates it to the appropriate InfiniBand request, and propagates the InfiniBand request to the corresponding host system via InfiniBand environment 45. To write and read from the host memory, the TCA 43 can use the RDMA capabilities provided by InfiniBand environment 45. RDMA read/write requests require the virtual address in the host memory, the transaction length, and the memory region identification in order to be able to distinguish between virtual addresses that belong to different processes.

Figure 4:
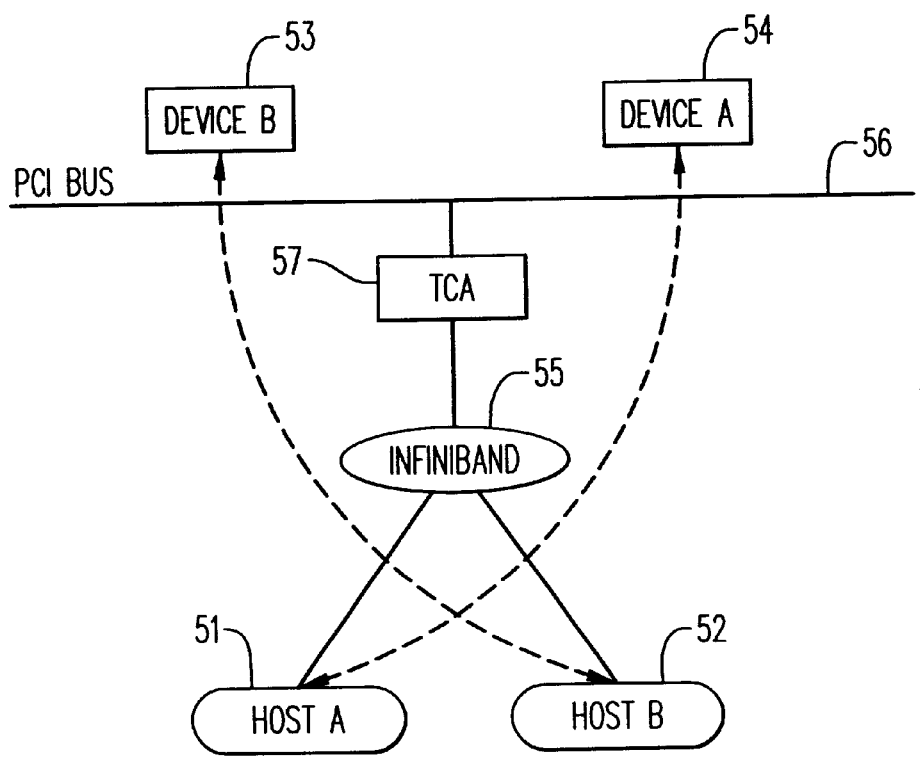
FIG. 4 is a schematic representation of a PCI system being connected to an InfiniBand network.

This approach leads to various problems, as will be described in connection with an example where two host systems (host A 51 and host B 52) communicate with two PCI I/O devices (device A 54 and device B 53) over an InfiniBand network 55, as shown in FIG. 4. The host A 51 communicates with the device A 54 and the host B 52 communicates with the device B 53. For this purpose the host A 51 comprises a device driver for communication with the device A 54 and the host B 52 comprises a device driver for communication with the device B 53. When one of the PCI devices 53 and 54 starts a PCI transaction, it puts the destination address on the PCI bus 56. When the TCA 57 detects this PCI transaction, it reads the destination address (PCIAddr) posted on the PCI bus 56. Based on the destination address posted, the TCA 57 must determine the following: the host system to which this PCI transaction is assigned, the virtual address in the memory of this particular host system, and the memory region identification number.

In legacy PCI-based systems, a PCI device posts the physical address in the host memory space on the PCI bus. In the above configuration, however, in which there are multiple hosts 51 and 52 communicating with PCI devices 53 and 54 attached to the PCI bus 56, this approach has two significant difficulties:

1. The TCA 57 must maintain a translation table that maps the physical address to the virtual address, the memory region, and the host identification; and
2. The same physical address can belong to two different host systems.

The first problem adds complexity to the TCA hardware design. The second problem makes this approach insufficient for the destination determination.

Another approach would be to force the PCI device 53 or 54 to post a virtual address, instead of a physical one, on the PCI bus 56. But there would still be a problem with the host and the host memory region identification, because the same virtual address can belong to a different host system or to a different application on the same host system.

According to the present invention, each PCI device 53 and 54 that is attached to the PCI bus 56 has—after the PCI bus has been configured—a PCI address range associated therewith. The TCA 57 gets its own PCI memory range with a corresponding PCI bus address space. When a PCI device 53 or 54 wants to read data from one of the two host systems 51 or 52, or write data to one of the two host systems 51 or 52, it posts the address that belongs to the TCA 57 on the PCI bus 56.

According to a preferred implementation of the present invention, the TCA's PCI bus address space is subdivided into a plurality of PCI memory windows according to the PCI address. Each such PCI memory window is associated with information required for the destination host system, the host memory region, and the virtual address identification. This information can be maintained in a table (herein referred to as PCI memory window table) inside the TCA 57. The size of the PCI memory window table, the number of table entries, and the entry size depend on the specific design decision and implementation. The recommended number of entries in such a table may vary between 64 and 512. Smaller or larger PCI memory window tables are possible, as well.

According to the present invention, a new address type is defined. This new address type is herein referred to as a pseudo address. The size of the pseudo address is equal to the PCI address size, i.e., 32 bits for PCI and 64 bits for PCIX (Peripheral Component Interconnect Extended). The pseudo address is subdivided into two parts: the base part and the offset part. The base part is used for appropriate PCI memory window identification and the offset part is used for the virtual address calculation. The size of the base part and the offset part depend on specific design decisions and implementation. As soon as the TCA 57 has extracted the base part from the pseudo address posted on the PCI bus 56, it can fetch all the necessary information from the respective PCI memory window table entry to prepare an RDMA request and send it through the InfiniBand network 55 to the destination host system 51 or 52.

Figure 5:
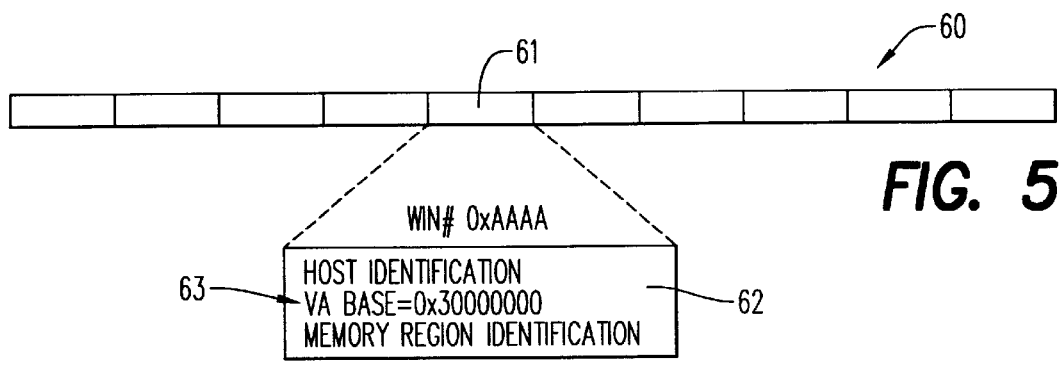
FIG. 5 is a schematic representation of a PCI memory table and the address translation in accordance with the present invention.

In the following, one example for the calculation of the virtual address is described. For this example, it is assumed that the pseudo address size is 32 bits and that the base part and the offset part are each 16 bits wide. If the pseudo address posted on the PCI bus 56 is 0×AAAA0100, then the base part is 0×AAAA and the offset part is 0×0100. In the present example, the table entry Win#0×AAAA (reference number 61) of the PCI memory window table 60 contains the information 62 shown in FIG. 5. Then the virtual address base part is 0×30000000 (VABase; reference number 63) and the destination virtual address (VA) is equal to the virtual address base part (VABase) AND the pseudo address offset part, i.e., the destination virtual address is 0×30000100. According to the present invention, the table entry (e.g., Win#0×AAAA in the above example) is used as an index for accessing the PCI memory window table 60, i.e., the base part points to a specific entry in the PCI memory window table. The offset part of the pseudo address comprises the offset of the destination virtual address. Each entry in the PCI memory window table corresponds to a memory region on a host system.

In the following, the pseudo address generation algorithm is described in a more formal way. The algorithm, in accordance with the present invention, operates on the inputs:

Virtual address (VA);
Memory region size (Size)
Memory access grant key (R_Key), defined by Infini-Band Association (IBA) to protect the memory from an unsolicitate access.

The algorithm generates the outputs:

list (List) of the pseudo addresses associated with the host memory region. The number of the pseudo addresses associated with the memory region depends on the memory region size.

The following algorithm attributes are used:

Number of the memory region (WinNum)
Memory window size (WinSize)
Width of the virtual address (VAWidth), preferrably 32 or 64 bits
N most significant bits of the virtual address (VABase). N is defined by the number of the memory windows and the PCI memory space associated with the memory windows table.
Least significant bits of the address (Offset). The Offset is VAWidth—N.
Host identification (HostID).

An examplary representation of an algorithm in accordance with the present invention is now given:

While (Size>0) do
  a) Find unused memory window entry in the memory windows table
  b) If there is no free memory window, exit with error
  c) Index<—gets the index of the found memory window entry in the memory windows table
  d) Entry::VABase<—gets N most significant bits of the VA
  e) Entry::R_Key<—gets the R_Key
  f) Entry::HostID<—host identification
  g) Pseudo address<—gets concatenation of the Index with the Offset of VA
  h) Add pseudo address to the List
  i) Decrement the Size (Size<—Size—(WinSize—Offset))
  j) Increment the VA (VA<—VA+(WinSize—Offset)).

As a result of executing this algorithm given the data buffer virtual address, the device driver gets the list of the pseudo addresses and each pseudo address corresponds to the entry in the memory windows table on the TCA. The correspondent entry in the memory windows table contains the VABase, R_Key, and other information.

In the following, the virtual address calculation algorithm is described in a more formal way. The algorithm, in accordance with the present invention, operates on the input:

address posted by an I/O device on the PCI bus (PCIAddr).

The algorithm generates the outputs:

VA
R_Key
HostID

An exemplary representation of an algorithm in accordance with the present invention is now given:
1. Index<—gets the N most significant bits of the PCIAddr
2. Entry<—gets the "Index" entry of the memory windows table
3. VA<—gets the Entry::VABase (N most significant bits) concatenated with (VAWidth—N) least significant bist of the PCIAddr.
4. R_Key<—gets the Entry::R_Key
5. HostID<—gets the Entry::HostID.

As a result of executing this algorithm, given the address (PCIAddr) posted on the PCI bus, the TCA calculates the virtual address (VA), R_Key, the host identification (HostID), and all the attributes required to generate the InfiniBand RDMA request.

In the following, one example for the initialization of the PCI memory windows is given. The TCA 57 or the TCA SSP on the host system is responsible for the creation and maintenance of the PCI memory window table 60. The device driver on the host system registers all the memory regions that should be accessible by RDMA requests. Preferably, all descriptors and data buffers are allocated from these memory regions. The device driver uses SSP services to register a memory region with the TCA. When a device driver asks the SSP to register a memory region on the host system, it passes a virtual address of the region base and the region size to the SSP. The SSP registers the memory region on the host system with the appropriate permissions and allocates a new PCI memory window(s) on the TCA 57. The TCA 57 allows a PCI memory window table to be updated by only one host system at a time in order to avoid conflicts. Each PCI memory window contains the host memory region identification, the host identification, and the virtual address base (VABase) of the host memory region. The SSP generates the pseudo address that is built from the memory window index (base part) and the virtual address offset (offset part), e.g., the generated pseudo address for Win#0× AAAA=0×AAAA0000 (cf. above example). The PCI devices 53 and 54 need only post the pseudo addresses on the PCI bus 56. It is, according to the present invention, the responsibility of the device driver at the host to ensure that the PCI devices 53, 54 post only the pseudo addresses on the PCI bus 56 and to provide these addresses to the PCI devices 53, 54.

It is the main purpose of the device driver to provide the PCI device with information about the type of the DMA operation (read or write) and the location of the data buffers in the host memory. The data buffer is a virtually contiguous memory buffer that is allocated by the device driver or the application. The data buffer is not necessarily physically contiguous. Since the device needs a physical address for the DMA operation, the data buffer is represented by the list of the physical addresses. Such a physical address list is called descriptors list. Each physical address represents a particular physical page. To ensure that the data buffer has a unique representation with the descriptors list, the data buffer should be pinned, i.e., each virtual page is locked to the particular physical page and cannot be swapped out.

To summarize, for each data buffer a conventional device driver does the following:

1. pin the data buffer using an operating system (OS) service,
2. prepare the list of physical addresses associated with the data buffer, and
3. generate the descriptors list that includes all the information required to describe the data buffer, including the physical addresses. Note that the format of the descriptors list depends on the particular design decision.

According to the present invention, the device driver behaves differently.

a) The device driver uses the SSP service to register a memory region. This memory region may be associated with a single data buffer or descriptors list, or it may include a number of data buffers. The memory registration is necessary to enable remote access to the host memory. This service should be used instead of the conventional memory pinning (cf. no. 1. above).

b) Once the memory region is pinned (cf. a) above), the device driver should use the SSP service to prepare the list of the pseudo addresses. These pseudo addresses shall be used both by the PCI device and the device driver instead of the physical addresses.

c) The device driver generates the descriptors list, in the same fashion as it is used to do in conventional implementations. The only difference is that the pseudo addresses are used instead of the physical addresses used so far. Instead of keeping an array of physical addresses per descriptor or data buffer, the device driver is required to keep an array (list) of pseudo addresses.

According to the present invention, the SSP is designed to translate a virtual address (VA) of the registered host memory regions to the array of corresponding pseudo addresses and to provide an interface for the device driver for this operation.

The present invention can be used in any InfiniBand system that has an IOU with more than one legacy PCI device connected thereto. It is an advantage of the scheme presented and claimed herein that it provides a complete problem resolution without adding complexity to the TCA design and IOU design. It is another advantage of the invention that is does not require significant changes in the device driver design and implementation.

Figure 6:
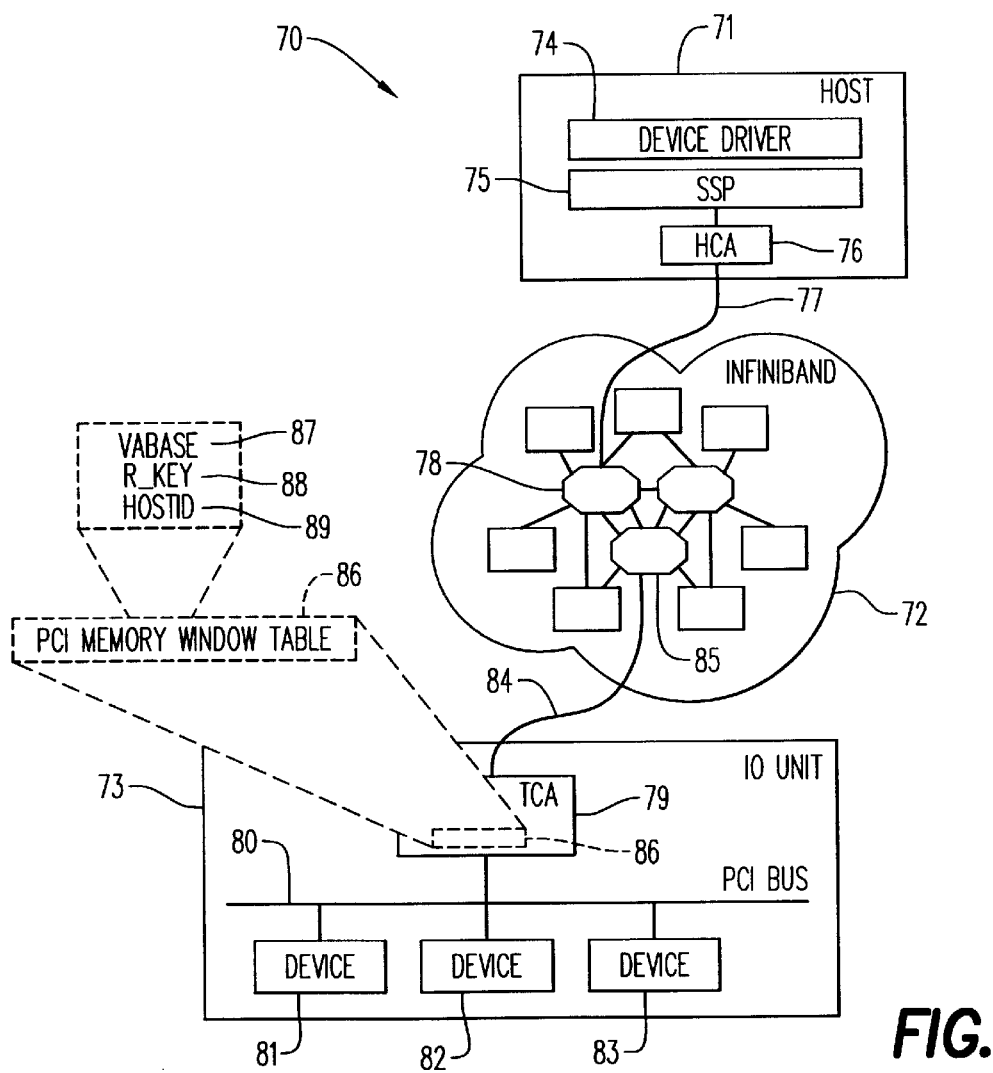
FIG. 6 is a schematic representation of an InfiniBand configuration in accordance with the present invention.

The block diagram of a typical InfiniBand configuration 70, according to the present invention, is depicted in FIG. 6. As illustrated in this Figure, the InfiniBand configuration 70 comprises a host 71 that is connected through an InfiniBand network 72 to an IOU 73. The host 71 comprises a device driver 74, an SSP component 75, and an HCA 76. In addition, the host 71 comprises a host memory, not illustrated in FIG. 6. The HCA 76 is connected via a link 77 to one of the switch fabrics 78 of the InfiniBand network 72. The IOU 73 comprises a TCA 79, a PCI bus 80, and a plurality of IO devices 81–83 (PCI devices). A link 84 is established between the TCA 79 and another switch fabric 85 in the InfiniBand network 72. The TCA 79 maintains a PCI memory window table 86. The PCI memory window table 86 comprises a plurality of table entries. In the present configuration example, there are 6 table entries depicted. Each such table entry comprises a VABase 87, an R_Key 88, and a HostID 89, as schematically illustrated in FIG. 6.

The present invention having been thus described with particular reference to the preferred forms thereof, it will be obvious that various changes and modifications may be made therein without departing from the spirit and scope of the present invention as defined in the appended claims.

What is claimed is:

1. A method for enabling one or more PCI devices to read data via a network from a memory of a host system or to write data to said memory on said host system via said network, wherein said PCI devices are attached to a PCI bus and connected to said network via a target channel adpater that translates PCI bus transactions and interrupts into network requests and that translates network requests to PCI transactions, and wherein each of said PCI devices has a PCI address range associated therewith, comprising:
    (a) allocating a PCI memory window on said target channel adpater, said PCI memory window being assigned to said host system,
    (b) posting a pseudo address that belongs to said target channel adpater on said PCI bus when reading data via said network from said memory of said host system or when writing data on said memory of said host system via said network, wherein said pseudo address comprises a base part and an offset part,
    (c) using said base part to identify said PCI memory window assigned to said host system by step (a), and
    (d) using said offset part for calculating a virtual address specifying a physical location of said memory at said host system.

2. The method of claim 1, wherein said pseudo address posted on said PCI bus serves as an index to said PCI memory window assigned to said host system.

3. The method of claim 1, wherein said pseudo address posted on said PCI bus enables at least one of said PCI devices to fetch information from said PCI memory window assigned to said host system.

4. The method of claim 1, wherein said target channel adpater includes a PCI memory window table with a plurality of entries, each entry being associated with a base part of said pseudo address.

5. The method of claim 4, wherein said memory includes a plurality of memory regions, and wherein each entry in said PCI memory window table corresponds to a different one of said plurality of memory regions on said host system.

6. The method of claim 5, wherein said host system comprises a device driver for at least one of said PCI devices, and wherein said device driver registers said memory regions on said host system with said target channel adpater, thereby making said memory regions accessible by said at least one of said PCI devices.

7. The method of claim 6, wherein said host system further comprises means for enabling said device driver to register said memory regions on said host system.

8. The method of claim 4, wherein said host system further comprises means for creating and maintaining said PCI memory window table.

9. The method of claim 8, wherein said means for creating and maintaining also registers said memory region on said host system with appropriate permissions and allocates said PCI memory window on said target channel adpater.

10. A method for address translation between one or more PCI devices that are attached to a PCI bus and connected via a target channel adpater and an network to a host system, wherein each of said PCI devices has a PCI address range associated therewith, and wherein said target channel adpater translates PCI bus transactions and PCI bus interrupts into network requests and network requests to PCI transactions, comprising:
    (a) allocating a PCI memory window on said target channel adpater, said PCI memory window being assigned to said host system,
    (b) posting a pseudo address that belongs to said target channel adpater on said PCI bus, wherein said pseudo address comprises a base part and an offset part,
    (c) using said base part to identify said PCI memory window assigned to said host system by step (a), and
    (d) using said offset part for calculating a virtual address specifying a physical location of a memory of said host system.

11. The method of claim 10, wherein said pseudo address posted on said PCI bus serves as an index to said PCI memory window assigned to said host system.

12. The method of claim 10, wherein said pseudo address posted on said PCI bus enables at least one of said PCI devices to fetch information from said PCI memory window assigned to said host system.

13. The method of claim 10, wherein said target channel adpater includes a PCI memory window table with a plurality of entries, each entry being associated with a base part of said pseudo address.

14. The method of claim 13, wherein said memory includes a plurality of memory regions, and wherein each entry in said PCI memory window table corresponds to a different one of said plurality of memory regions on said host system.

15. The method of claim 14, wherein said host system comprises a device driver for at least one of said PCI devices, and wherein said device driver registers said memory regions on said host system with said target channel adpater, thereby making said memory regions accessible by said at least one of said PCI devices.

16. The method of claim 15, wherein said host system further comprises means for enabling said device driver to register said memory regions on said host system.

17. The method of claim 16, wherein said means for creating and maintaining also registers said memory regions on said host system with appropriate permissions and allocates said PCI memory window on said target channel adpater.

18. The method of claim 13, wherein said host system further comprises means for creating and maintaining said PCI memory window table.

19. A system comprising:
a host system that includes a host memory,
a network that carries a plurality of network requests,
a PCI bus that carries a plurality of PCI bus transactions and/or PCI bus interrupts,
a target channel adapter that connects said PCI bus via said network to said host system and that translates said PCI bus transactions and PCI bus interrupts, which are destined for said host system, to network requests and said network requests, which are destined for said PCI bus, to said PCI bus transactions, wherein a PCI memory window is allocated on said target channel adpater and is assigned to said host system, and
one or more PCI devices that are attached to said PCI bus, that each have a PCI address range associated therewith and that each, when enabled, posts on said PCI bus one of said plurality of PCI bus transactions or PCI bus interrupts that includes a pseudo address, which belongs to said target channel adpater, when reading data via said network from said host memory or when writing data in said host memory via said network, wherein said pseudo address comprises a base part and an offset part, wherein said base part identifies said PCI memory window and wherein said offset part is useable for calculating a virtual address specifying a physical memory location in said host memory.

20. The system of claim 19, wherein said PCI devices are legacy PCI devices.

21. The system of claim 19, wherein a plurality of said PCI devices are combined to form an input/output unit.

22. The system of claim 19, wherein said target channel adpater comprises a PCI memory window table with a pluralty of entries, each entry being associated with a base part of said pseudo address.

23. The system of claim 19, wherein said host memory includes a plurality of memory regions, and wherein said host system comprises a device driver for at least one of said PCI devices, and wherein said device driver is enabled to register said memory regions of said host memory with said target channel adpater for making said memory regions accessible by said at least one of said PCI devices.

24. The system of claim 19, further comprising software means for execution of a pseudo address generation algorithm, wherein said pseudo address generation algorithm generates said pseudo address.

25. The system of claim 19, further comprising software means for execution of a virtual address calculation algorithm, wherein said virtual address calculation algorithm calculates said virtual address.

26. A memory media for a target channel adapter that is interconnected with one or more PCI devices via a PCI bus and connected via an network to a host system, wherein each of said PCI devices has a PCI address range associated therewith, and wherein said target channel adpater translates PCI bus transactions and PCI bus interrupts into network requests and network requests to PCI transactions, comprising:
first means for causing said target channel adapter to process an allocated PCI memory window, said PCI memory window being assigned to said host system,
second means for causing said target channel adapter to post a pseudo address that belongs to said target channel adpater on said PCI bus, wherein said pseudo address comprises a base part and an offset part,
third means for causing said target channel adapter to use said base part to identify said PCI memory window assigned to said host system by said first means, and
fourth means for causing said target channel adapter to use said offset part for calculating a virtual address specifying a physical location of a memory of said host system.

27. The memory media of claim 26, wherein said pseudo address posted on said PCI bus serves as an index to said PCI memory window assigned to said host system.

28. The memory media of claim 26, wherein said pseudo address posted on said PCI bus enables at least one of said PCI devices to fetch information from said PCI memory window assigned to said host system.

29. The memory media of claim 26, further comprising fifth means for causing said target channel adapter to process a PCI memory window table with a plurality of entries, each entry being associated with a base part of said pseudo address.

30. The memory media of claim 29, wherein said memory includes a plurality of memory regions, and wherein each entry in said PCI memory window table corresponds to a different one of said plurality of memory regions on said host system.

31. A system comprising:
a host system that includes a host memory, a network and a PCI bus,
a target channel adapter that connects said PCI bus via said network to said host system, wherein a PCI memory window is allocated on said target channel adpater and is assigned to said host system, and
one or more PCI devices that are attached to said PCI bus that each, when enabled, posts on said PCI bus a pseudo address, which belongs to said target channel adpater, when reading data via said network from said host memory or when writing data in said host memory via said network, wherein said pseudo address comprises a base part and an offset part, wherein said base part identifies said PCI memory window and wherein said offset part is indicative of a virtual address that specifies a physical memory location in said host memory.

* * * * *